(12) United States Patent
Robinson et al.

(10) Patent No.: US 11,631,982 B2
(45) Date of Patent: Apr. 18, 2023

(54) PORTABLE CHARGER ASSEMBLY OPERABLE TO CHARGE BATTERY SYSTEM

(71) Applicant: Caterpillar Inc., Peoria, IL (US)

(72) Inventors: Andrew B. Robinson, Peoria, IL (US); Dustin Craig Selvey, Eureka, IL (US); Christian D. Ritchie, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 499 days.

(21) Appl. No.: 16/804,120

(22) Filed: Feb. 28, 2020

(65) Prior Publication Data
US 2021/0273466 A1    Sep. 2, 2021

(51) Int. Cl.
*H02J 7/00* (2006.01)
*B60L 53/30* (2019.01)

(52) U.S. Cl.
CPC ............ *H02J 7/0042* (2013.01); *B60L 53/30* (2019.02); *B60L 2200/40* (2013.01)

(58) Field of Classification Search
CPC ...... H02J 7/0042; B60L 53/30; B60L 2200/40
See application file for complete search history.

(56) References Cited

U.S. PATENT DOCUMENTS

| | | | |
|---|---|---|---|
| 5,163,537 A | 11/1992 | Radev | |
| 5,598,083 A | 1/1997 | Gaskins | |
| 9,170,081 B2 | 10/2015 | Rudinec | |
| 9,644,501 B2* | 5/2017 | O'Connor | F28D 21/001 |
| 9,828,050 B2 | 11/2017 | Hindle | |
| 9,969,283 B2 | 5/2018 | Deahl et al. | |
| 9,975,415 B2 | 5/2018 | Jansen et al. | |
| 10,183,563 B2 | 1/2019 | Rayner et al. | |
| 10,711,576 B2* | 7/2020 | Bishop | F04B 47/02 |
| 2014/0077506 A1* | 3/2014 | Knight | F02B 63/044 290/1 A |
| 2016/0130985 A1* | 5/2016 | O'Connor | F01K 25/10 60/671 |
| 2018/0298731 A1* | 10/2018 | Bishop | E21B 7/022 |

FOREIGN PATENT DOCUMENTS

WO    2017147644    9/2017

* cited by examiner

*Primary Examiner* — Richard V Muralidar
(74) *Attorney, Agent, or Firm* — Xsensus, LLP

(57) ABSTRACT

A portable charger assembly operable to charge a battery system includes a housing defining a hollow space. The portable charger assembly also includes a charging module disposed within the hollow space of the housing. The charging module is adapted to provide power supply to the battery system. The portable charger assembly further includes a base adapted to be coupled with the housing. The base includes a base member including a first portion, a second portion, and a third portion. Each of the second and third portions is inclined relative to the first portion. The base also includes a first base plate fixedly coupled to the second portion of the base member. The base further includes a second base plate fixedly coupled to the third portion of the base member.

19 Claims, 10 Drawing Sheets

# PORTABLE CHARGER ASSEMBLY OPERABLE TO CHARGE BATTERY SYSTEM

TECHNICAL FIELD

The present disclosure relates to portable chargers. More particularly, the present disclosure relates to a portable charger assembly operable to charge battery systems.

BACKGROUND

Battery systems, such as those deployed on vehicles or other equipment, operating at isolated worksites, typically need Direct Current (DC) power for charging the battery systems. Remotely located worksites or underground worksites conventionally do not include readily available sources of DC power. Thus, chargers may have to be stationed at the remote worksites or the chargers may have to be transported to the remote worksites in order to facilitate charging of the battery systems. Conventionally, the chargers are installed at worksites on concrete pads and are surrounded by barricades.

U.S. Pat. No. 9,828,050 describes a mobile power supply housed within a wheeled trailer which can be towed to various locations, particularly remote locations, for providing electrical power as needed for operating equipment or for charging of batteries or other electrical supply devices at such remote locations. The apparatus includes a unique trailer design including venting means for preventing the accumulation of hydrogen normally associated with high power battery operation, particularly charging thereof and therewith, by monitoring hydrogen at all times within the trailer interior and selectively passively and actively venting the interior environment when hydrogen levels are high or whenever necessary. A unique roof design is included for gathering hydrogen near the upper portion of the interior roof construction adjacent to a venting outlet to facilitate expelling thereof.

SUMMARY OF THE DISCLOSURE

In an aspect of the present disclosure, a portable charger assembly operable to charge a battery system is provided. The portable charger assembly includes a housing defining a hollow space. The portable charger assembly also includes a charging module disposed within the hollow space of the housing. The charging module is adapted to provide power supply to the battery system. The portable charger assembly further includes a base adapted to be coupled with the housing. The base includes a base member including a first portion, a second portion, and a third portion. Each of the second and third portions is inclined relative to the first portion. The base also includes a first base plate fixedly coupled to the second portion of the base member. The base further includes a second base plate fixedly coupled to the third portion of the base member.

In another aspect of the present disclosure, a skid associated with a portable charger assembly adapted to charge a battery system is provided. The skid includes a base member including a first portion, a second portion, and a third portion. Each of the second and third portions is inclined relative to the first portion. The skid also includes a first base plate fixedly coupled to the second portion of the base member. The skid further includes a second base plate fixedly coupled to the third portion of the base member.

Other features and aspects of this disclosure will be apparent from the following description and the accompanying drawings.

DETAILED DESCRIPTION

Figure 1:
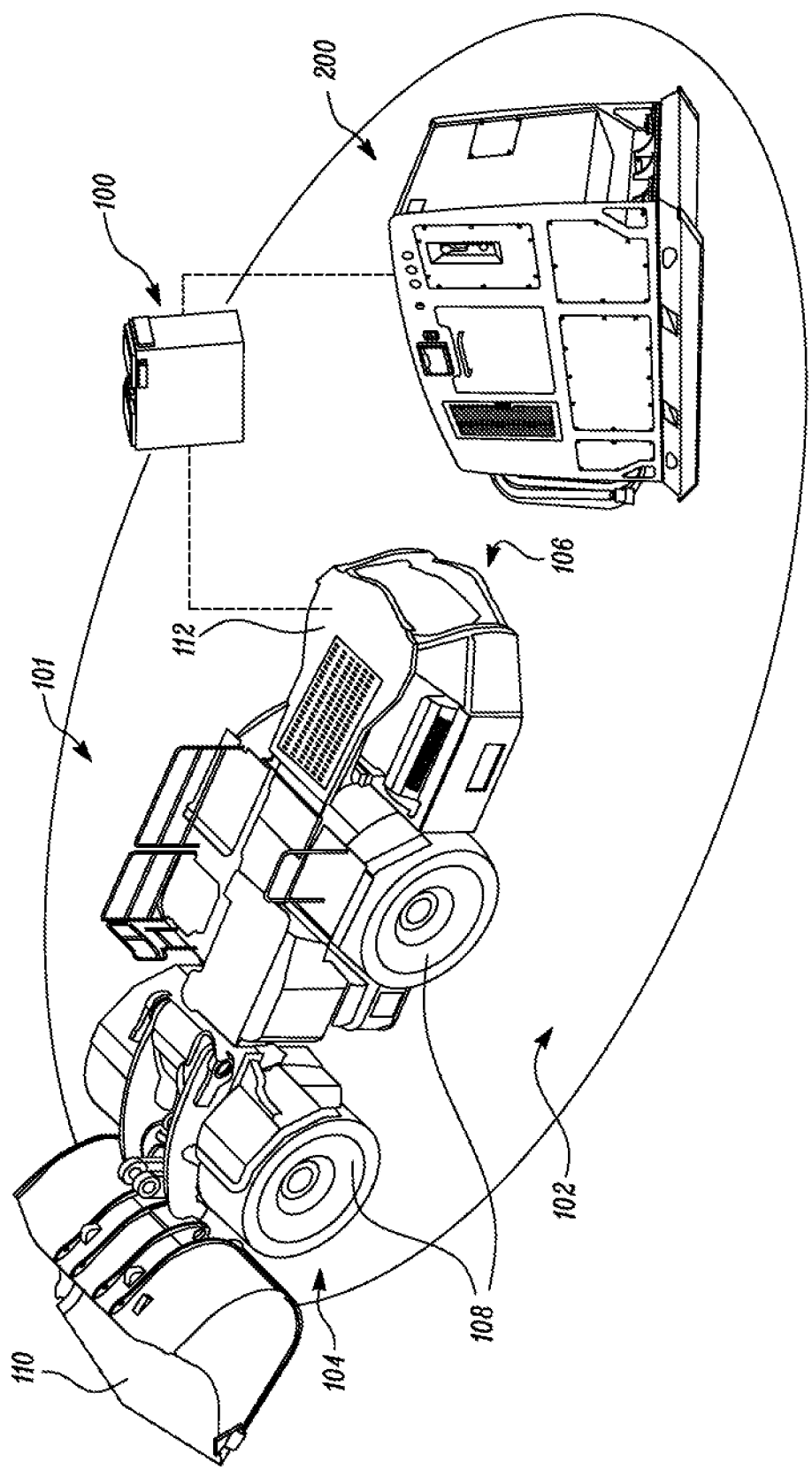
FIG. 1 is a schematic representation of a battery system associated with a vehicle and a portable charger assembly operable to charge the battery system, according to one embodiment of the present disclosure.

Wherever possible, the same reference numbers will be used throughout the drawings to refer to the same or like parts. Referring to FIG. 1, a schematic representation of a battery system 100 associated with a vehicle 101 is illustrated according to an embodiment of the present disclosure. Alternatively, the battery system 100 may be associated with another battery powered vehicle or equipment, without any limitations. The vehicle 101 is embodied as a battery-powered construction machine. In the illustrated example, the vehicle 101 is a wheel loader operating at a worksite 102. Alternatively, the vehicle 101 may be embodied as any other machine, such, an off-highway truck, a haul truck, a loader, a mining truck, and the like. Further, the vehicle 101 may embody a freight truck. In the illustrated example, the worksite 102 is an underground mining worksite. It should be noted that the vehicle 101 may perform one or more than one type of operations associated with an industry, such as mining, construction, farming, transportation, or any other industry known in the art.

The vehicle 101 defines a front end 104 and a rear end 106. The vehicle 101 includes a number of wheels 108 for moving the vehicle 101 at the worksite 102. In another embodiment, the vehicle 101 may have tracks instead of the wheels 108. Further, the vehicle 101 includes an implement 110 mounted proximate to the front end 104 of the vehicle 101. The implement 110 is embodied as a bucket herein. The vehicle 101 also includes the battery system 100. Further, the battery system 100 is disposed within an enclosure 112 of the vehicle 101 proximate to the rear end 106 of the vehicle 101. The battery system 100 provides power for driving the wheels 108 for propelling the vehicle 101 and other electric components of the vehicle 101. The battery system 100 needs to be charged periodically in order to ensure operation of the vehicle 101. The battery system 100 require a source of Direct Current (DC) power for charging thereof. The vehicle 101 may further include a generator (not shown) coupled to the power source. The generator may supply electric power to various electric components of the vehicle 101.

The present disclosure relates to a portable charger assembly 200 operable to charge the battery system 100. In other embodiments, the portable charger assembly 200 may be used to charge battery systems associated with other battery-powered vehicles or equipment. The portable charger assembly 200 may be transported to the worksite 102 and disposed proximate to the vehicle 101 for charging the battery system 100. The portable charger assembly 200 converts Alternating Current (AC) power to DC power that can be supplied to the battery system 100. The portable charger assembly 200 is connectible to the battery system 100 via a power cable (not shown). The portable charger assembly 200 is embodied as a high powered charger that can deliver approximately 500 Kilo Watt of power.

Figure 2:
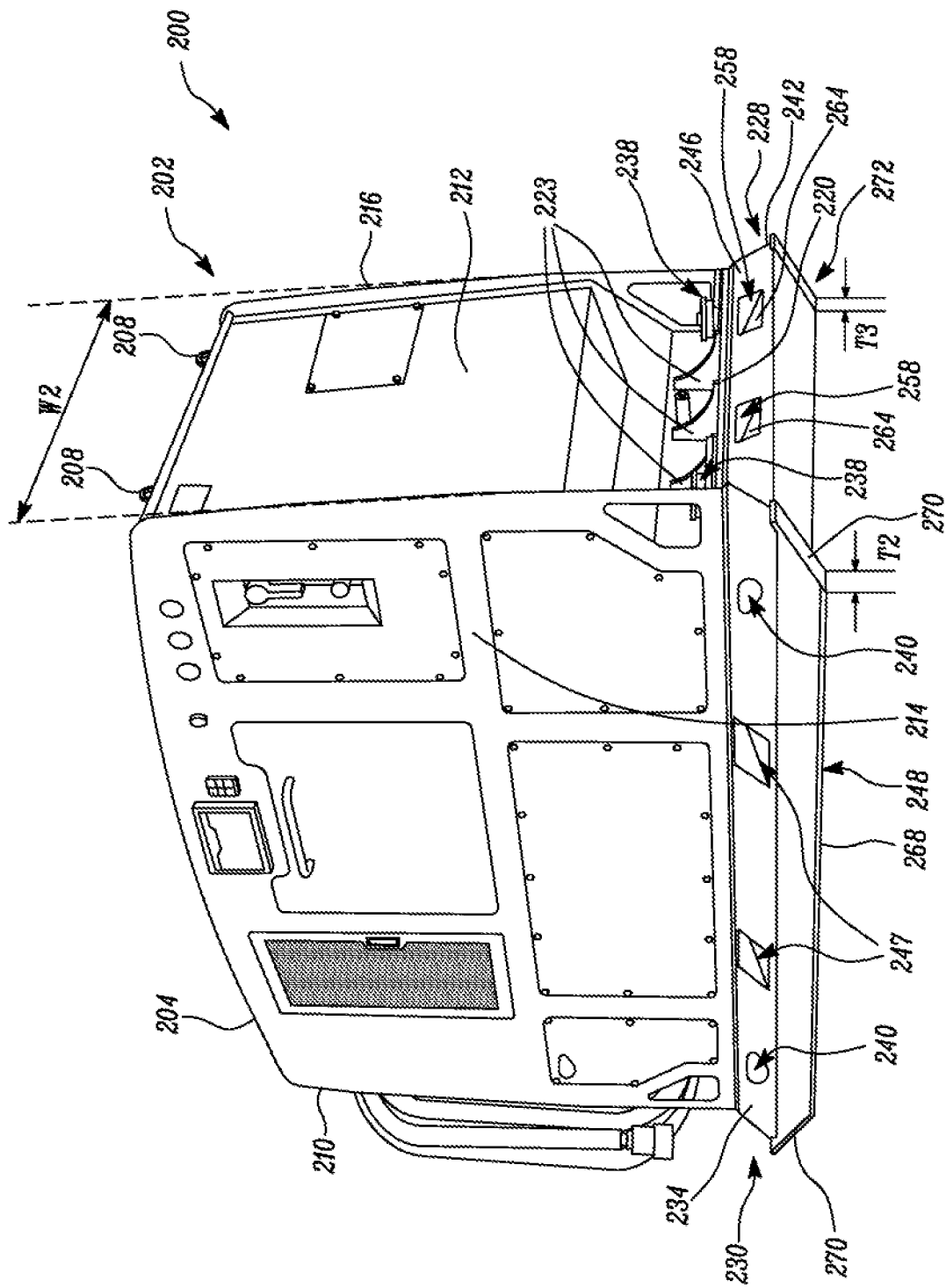
FIG. 2 is a perspective view of the portable charger assembly of FIG. 1, according to one embodiment of the present disclosure.
Figure 3:
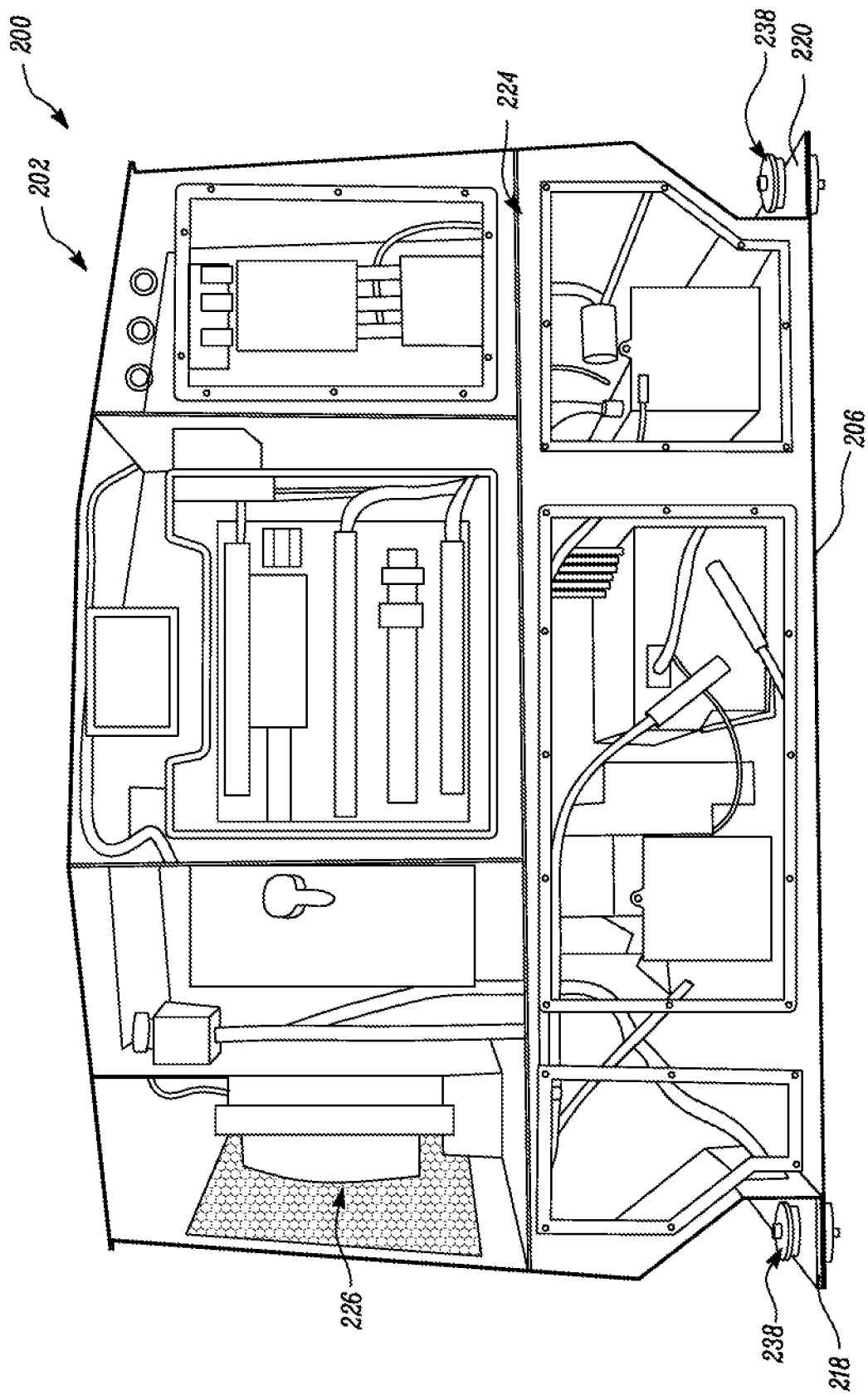
FIG. 3 is a cut-away view of a housing of the portable charger assembly of FIG. 2, according to one embodiment of the present disclosure.

As shown in FIG. 2, the portable charger assembly 200 includes a housing 202 defining a hollow space 224 (shown in FIG. 3). The housing 202 defines a second width "W2". Further, the housing 202 defines an upper surface 204 and a lower surface 206 (shown in FIG. 3). The upper surface 204 includes a generally curved profile whereas the lower surface 206 includes a generally straight profile. As illustrated in the accompanying figure, the housing 202 includes a number of hooks 208 disposed on the upper surface 204. More particularly, the housing 202 includes four hooks 208 disposed proximate to four corners of the upper surface 204. However, a total number of the hooks 208 may vary as per application requirements.

The housing 202 is embodied as a cuboid shaped structure. In an example, the housing 202 is made of a metal. Further, the housing 202 defines a number of side surfaces 210, 212, 214, 216 that between the upper surface 204 and the lower surface 206. The housing 202 include a plate 218 (shown in FIG. 3) extending from the side surface 210 of the housing 202 and a plate 220 extending from the side surface 212 of the housing 202. Each of the plates 218, 220 define a pair of first through-holes 222 (shown in FIG. 4A). Further, a number of ribs 223 are disposed between the plates 218, 220 and the corresponding side surfaces 210, 212. In the illustrated example, six ribs 223 are disposed between the plates 218, 220 and the corresponding side surfaces 210, 212.

As shown in FIG. 3, the housing 202 defines the hollow space 224 therein. The housing 202 is sealed in order to isolate the hollow space 224 of the housing 202 from outside environment. The portable charger assembly 200 includes a charging module 226 disposed within the hollow space 224 of the housing 202. The charging module 226 provides power supply to the battery system 100. The charging module 226 includes a number of components to covert AC power to DC power, such as, breakers, contactor, filters, inverters, capacitors, inductors, fuses, cooling units, and the like, that are arranged within the housing 202.

Further, the housing 202 may include a port (not shown) that allows connection of an AC power source (not shown) to the portable charger assembly 200. The AC power may be supplied to the portable charger assembly 200 by the AC power source present at the worksite 102. Moreover, the housing 202 may define an outlet port (not shown) that allows the power cable to be connected with the portable charger assembly 200.

Figure 4:
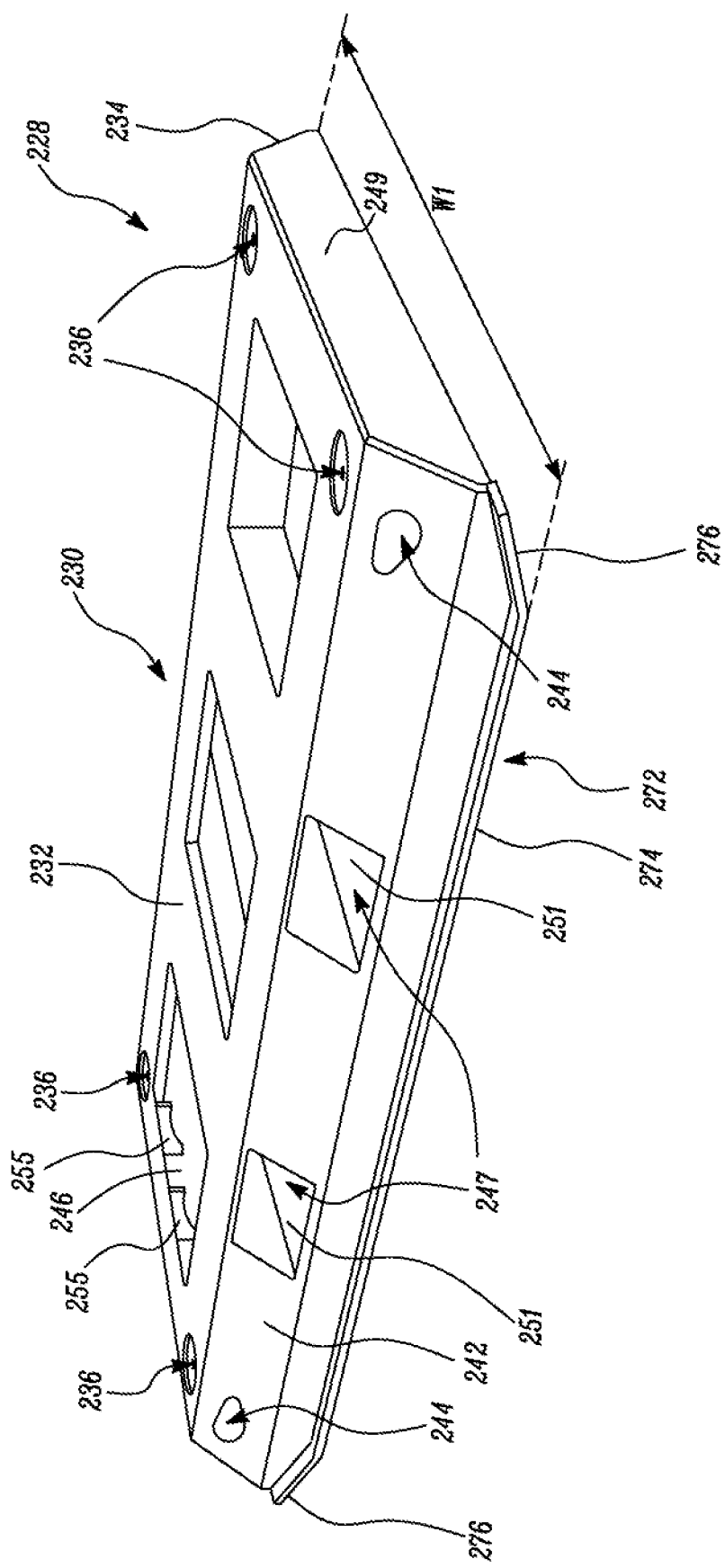
FIG. 4 is a perspective view of a base of the portable charger assembly of FIG. 2.

As shown in FIG. 4, the portable charger assembly 200 includes a base 228 coupled with the housing 202 (see FIGS. 2 and 3). The base 228 is hereinafter interchangeably referred to as a "skid 228". When the base 228 is coupled with the housing 202, the lower surface 206 (see FIG. 3) of the housing 202 is in contact with the base 228. The base 228 is made of a metal. In one example, the base 228 is made of mild steel.

The base 228 defines a first width "W1". The first width "W1" of the base 228 is greater than the second width "W2" (see FIG. 2) of the housing 202. The base 228 includes a base member 230. The base member 230 includes a first portion 232, a second portion 234, and a third portion 242. Each of the second and third portions 234, 242 is inclined relative to the first portion 232. The base member 230 also defines a number of second through-holes 236 in the first portion 232. More particularly, the base member 230 defines four second through-holes 236. The base member 230 defines a thickness "T1" (shown in FIG. 4A) at each of the first, second, and third portions 232, 234, 242.

In an example, the base member 230 is embodied as a unitary component. The base member 230 is embodied as a metal piece that is bent to form the first, second, and third portions 232, 234, 242. In other examples, the first, second, and third portions 232, 234, 242 may be manufactured as separate components that are assembled to form the base member 230. In such examples, the second and third portions 234, 242 may be connected to the first portion 232 by welding.

Moreover, the second portion 234 defines one or more first openings 240 (shown in FIG. 2) and the third portion 242 defines one or more second openings 244. In the illustrated example, the second portion 234 defines two first openings 240 and the third portion 242 defines two second openings 244. The first openings 240 and the second openings 244 are embodied as elliptical shaped through-openings.

Further, the base member 230 defines a pair of first passages 247 extending between the second portion 234 and the third portion 242. The first passages 247 extend along the first width "W1" of the base 228. The pair of first passages 247 are defined by the first portion 232 and plates 251. The plates 251 are welded to each of the second and third portions 234, 242.

Further, a first side plate 246 and a second side plate 249 disposed opposite to the first side plate 246 are coupled to the base member 230. The first and second side plates 246, 249 are coupled to the base member 230 by welding. Moreover, a number of second ribs 255 are disposed between the first side plate 246 and the first portion 232. In the illustrated example, three second ribs 255 are disposed between the first side plate 246 and the first portion 232. A number of third ribs (not shown) are also disposed between the second side plate 249 and the first portion 232. The third ribs are similar to the second ribs 255. In the illustrated example, three third ribs are disposed between the second side plate 249 and the first portion 232.

As shown in FIG. 2, the base member 230 defines a pair of second passages 258 disposed perpendicular to the pair of first passages 247. Each of the second passages 258 is defined by the first portion 232 (see FIG. 4A) and a structure 264. The base 228 includes two structures 264 that are welded to the first portion 232. Moreover, each of the second passages 258 extend inwards from the first side plate 246.

The portable charger assembly 200 includes a first base plate 248 fixedly coupled to the second portion 234 of the base member 230. The first base plate 248 defines a thickness "T2" that is greater than the thickness "T1" of the base member 230 (see FIG. 4A). The first base plate 248 defines a first contact surface 268 and a pair of second contact surfaces 270 inclined relative to the first contact surface 268. The first contact surface 268 and the second contact surfaces 270 contact a ground surface during transportation of the portable charger assembly 200 or other components on which the portable charger assembly 200 is mounted for transportation thereof. In an example, the first base plate 248 is coupled with the second portion 234 by welding.

The portable charger assembly 200 also includes a second base plate 272 fixedly coupled to the third portion 242 of the base member 230. The second base plate 272 defines a thickness "T3" that is greater than the thickness "T1" of the base member 230. Referring now to FIG. 4, the second base plate 272 defines a third contact surface 274 and a pair of fourth contact surfaces 276 inclined relative to the third contact surface 274. The third contact surface 274 and the fourth contact surfaces 276 contact the ground surface during transportation of the portable charger assembly 200 or other components on which the portable charger assembly 200 is mounted for transportation thereof. In an example, the second base plate 272 is coupled with the third portion 242 by welding.

Figure 4A:
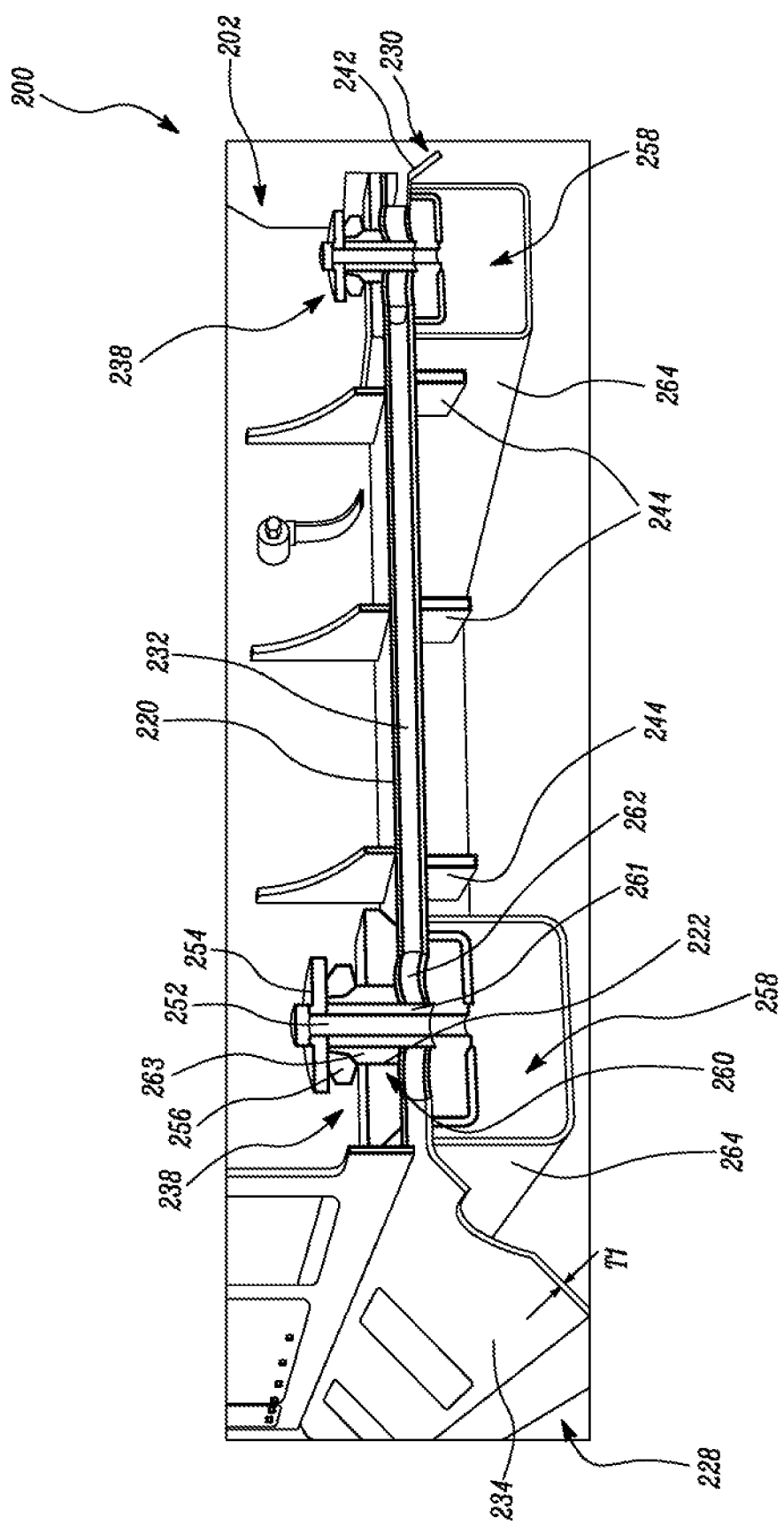
FIG. 4A is a sectional view illustrating a pair of vibration mounts, a portion of the housing, and the base of the portable charger assembly of FIG. 2.

As shown in FIG. 4A, the portable charger assembly 200 includes a number of vibration mounts 238 to removably couple the base 228 with the housing 202. More particularly, the base member 230 is removably coupled with the housing 202 using the vibration mounts 238. The portable charger assembly 200 includes four vibration mounts 238. In the illustrated example, the vibration mounts 238 are embodied as isolation mounts that allow coupling of the housing 202 with the base 228, as well as isolate the components disposed within the housing 202 from vibrations. Each of the number of second through-holes 236 (see FIG. 4) in the base member 230 align with the corresponding first through-hole 222 in the housing 202 to receive the vibration mounts 238 to couple the base 228 with the housing 202.

The vibration mounts 238 that couples the plate 220 of the housing 202 with the base 228 will now be explained in detail with reference to FIG. 4A. However, it should be noted that the details of the vibration mounts 238 described below is applicable to the vibration mounts 238 that couples the plate 218 (see FIG. 3) of the housing 202 with the base 228. The vibration mount 238 includes a bolt 252, a washer 254, a first mount 256, a sleeve 261, and a second mount 260. The washer 254 is disposed below a head portion of the bolt 252. It should be noted that the first mount 256, the second mount 260, and the sleeve 261 are made of a flexible material, such as rubber. Further, the sleeve 261 is disposed around the bolt 252 and extends along more than half of an overall length of the bolt 252. The sleeve 261 is embodied as a generally tubular member defining a hollow portion for receiving the bolt 252.

Further, the first and second mounts 256, 260 are disposed around the sleeve 261. The first mount 256 is embodied as an annular ring defining a circular through-opening to receive the sleeve therein. Moreover, the second mount 260 includes a first mount portion 262 and a second mount portion 263. The first mount portion 262 and the second mount portion 263 together define a circular through-opening for receiving the sleeve 261 therethrough. The first mount portion 262 has a diameter that is greater that a diameter of the second mount portion 263. The first mount portion 262 is disposed between the plate 220 and the base member 230. It should be noted that design and details of various components of the vibration mounts 238 described herein is exemplary in nature, and the vibration mounts 238 may include any other design or combination of components generally known in the art, without any limitations.

Figure 5:
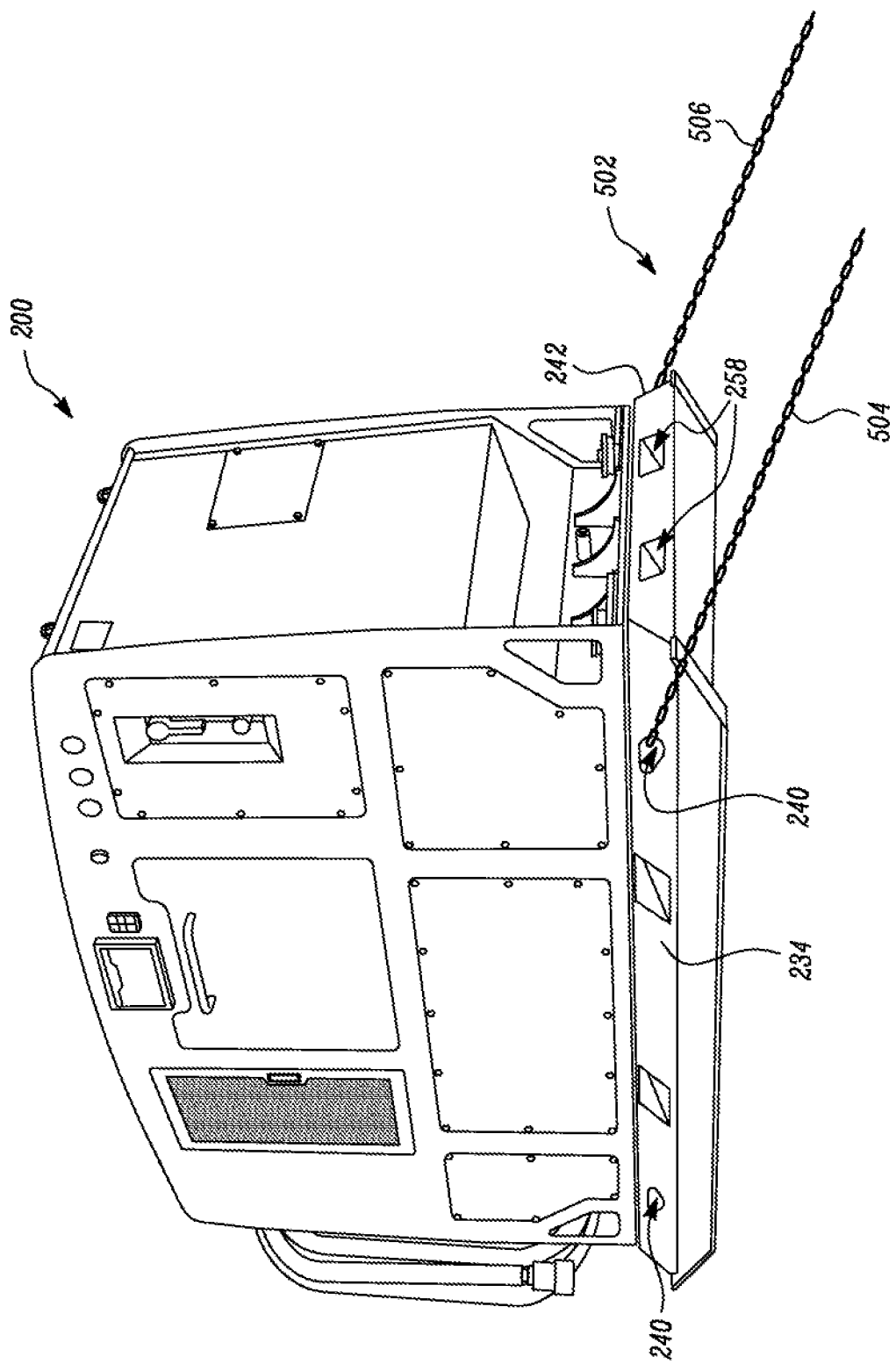
FIG. 5 illustrates the portable charger assembly being dragged using a pulling device.

Further, the portable charger assembly 200 may be transported to the worksite 102 (see FIG. 1) using a number of techniques. Such techniques will now be explained in relation to FIGS. 5 to 9. As shown in FIG. 5, the portable charger assembly 200 may be dragged by a pulling device 502 for transportation of the portable charger assembly 200 from one place to another. For this purpose, the one or more first openings 240 and the one or more second openings 244 (see FIG. 4) couple with the pulling device 502 for transportation of the portable charger assembly 200.

The pulling device 502 may include chains, cables, or ropes. In the illustrated example, the pulling device 502 includes a first chain 504 and a second chain 506 to drag the portable charger assembly 200. As illustrated herein, the first chain 504 is coupled with the first opening 240 and the second chain 506 is coupled with the second opening 244 to move the portable charger assembly 200.

Figure 6:
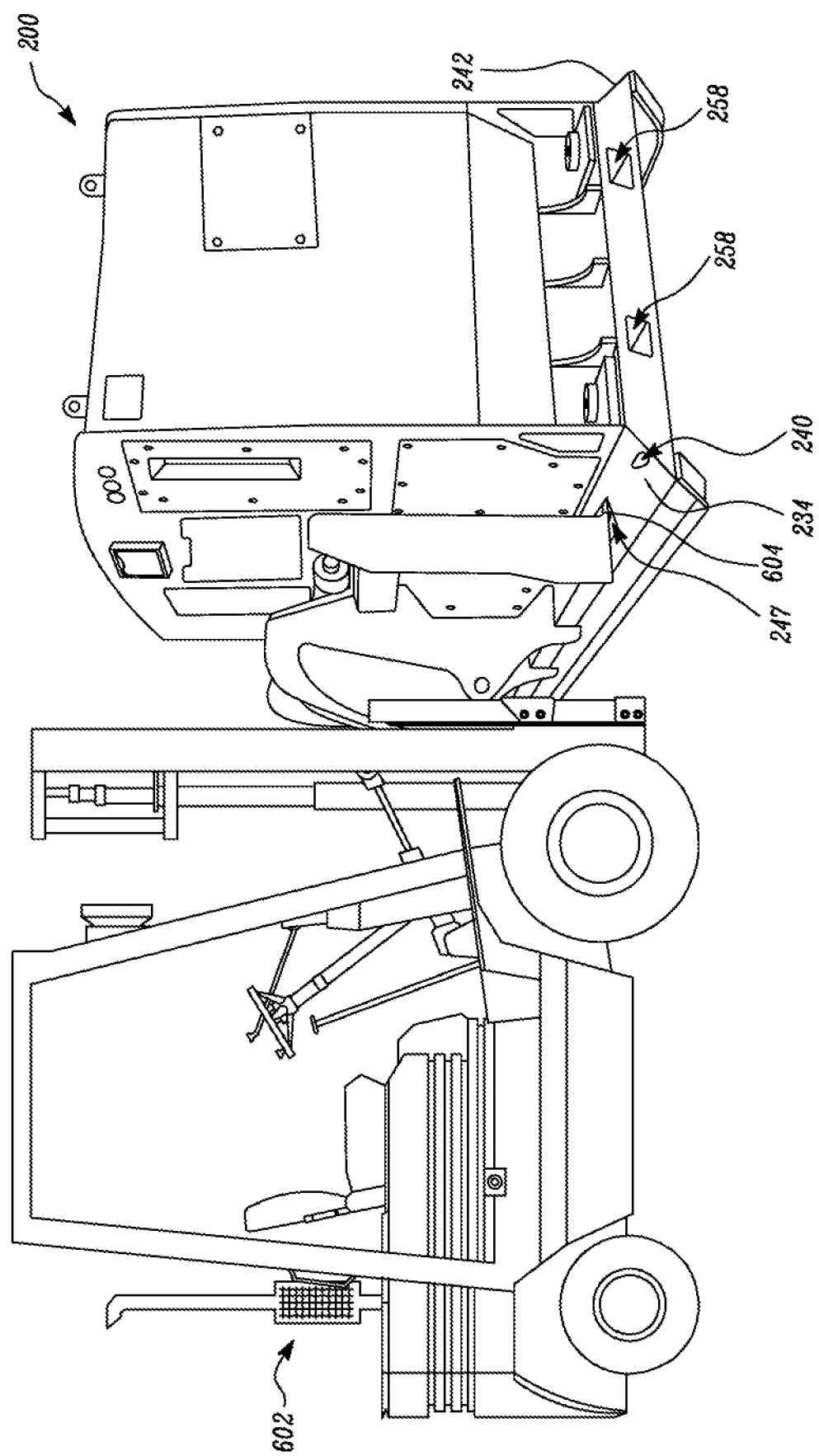
FIG. 6 illustrates the portable charger assembly being transported by a transport vehicle.

Referring now to FIG. 6, the portable charger assembly 200 may be transported by a transport vehicle 602. In the illustrated example, the pair of first passages 247 couple with the transport vehicle 602 for transportation of the portable charger assembly 200. More particularly, each of the first passages 247 receive a corresponding arm 604 of a pair of arms 604 of the transport vehicle 602 for transportation of the portable charger assembly 200. Alternatively, the pair of second passages 258 may couple with the transport vehicle 602 for transportation of the portable charger assembly 200. More particularly, each of the second passages 258 may receive a corresponding arm 604 of the pair of arms 604 of the transport vehicle 602 for transportation of the portable charger assembly 200. In the illustrated example, the transport vehicle 602 is embodied as a forklift. Alternatively, the transport vehicle 602 may be embodied as any other transport vehicle generally known in the art that allows transportation of the portable charger assembly 200.

Figure 7:
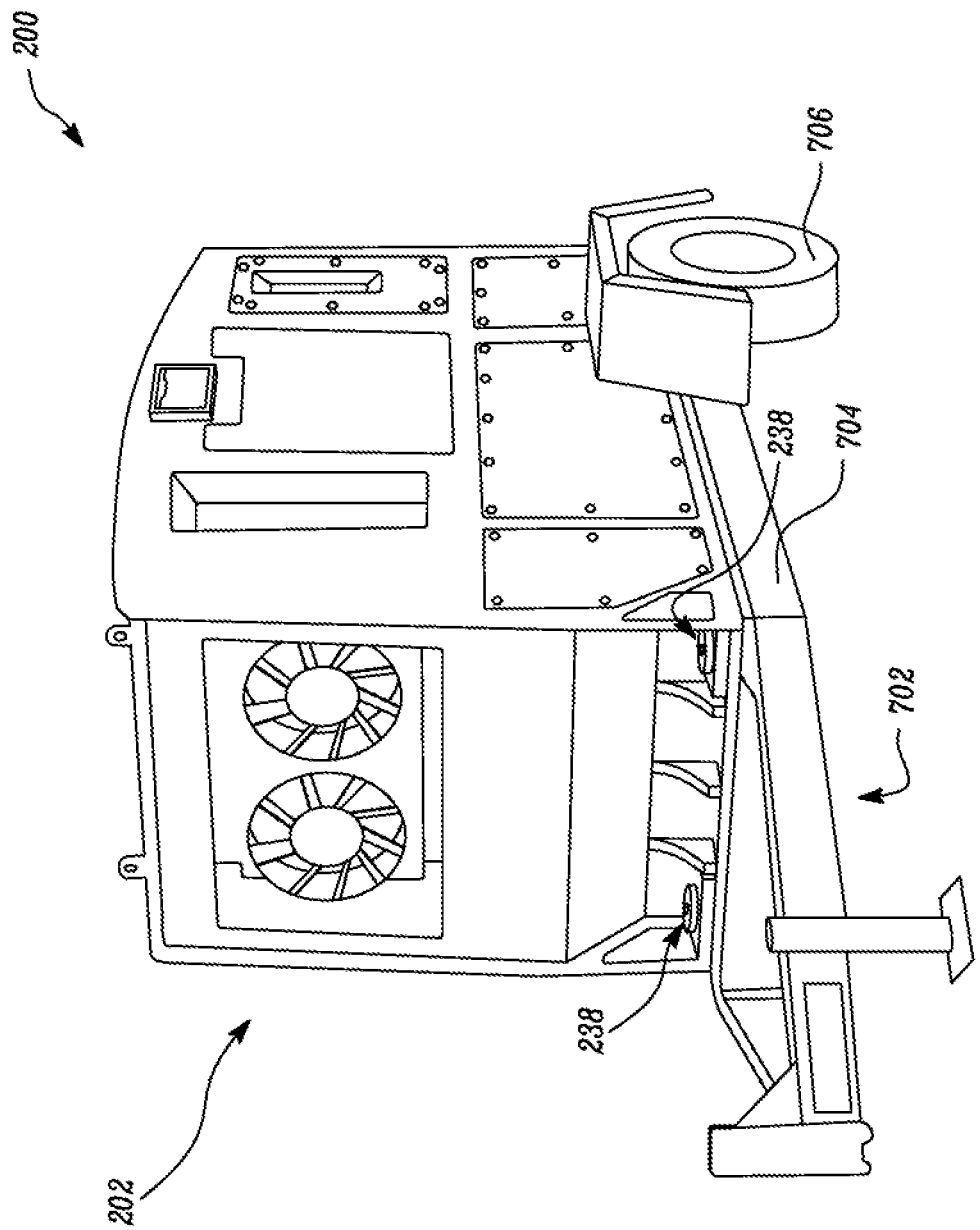
FIG. 7 illustrates the portable charger assembly being transported by a trailer.

In other examples, the portable charger assembly 200 is transportable by a trailer 702, a machine implement 800, or a lifting device 902. As shown in FIG. 7, the portable charger assembly 200 may be transported by the trailer 702. The trailer 702 includes a frame 704 and wheels 706 for movement of the trailer 702. As illustrated, the portable charger assembly 200 is positioned on the frame 704 of the trailer 702. When the trailer 702 is used for transportation of the portable charger assembly 200, the housing 202 is separated from the base 228 (see FIGS. 2 and 4). Further, the housing 202 is coupled with the frame 704 using the vibration mounts 238. The trailer 702 may then be coupled to a powered vehicle, such as a truck, in order to facilitate transportation of the trailer 702 to the worksite 102.

Figure 8:
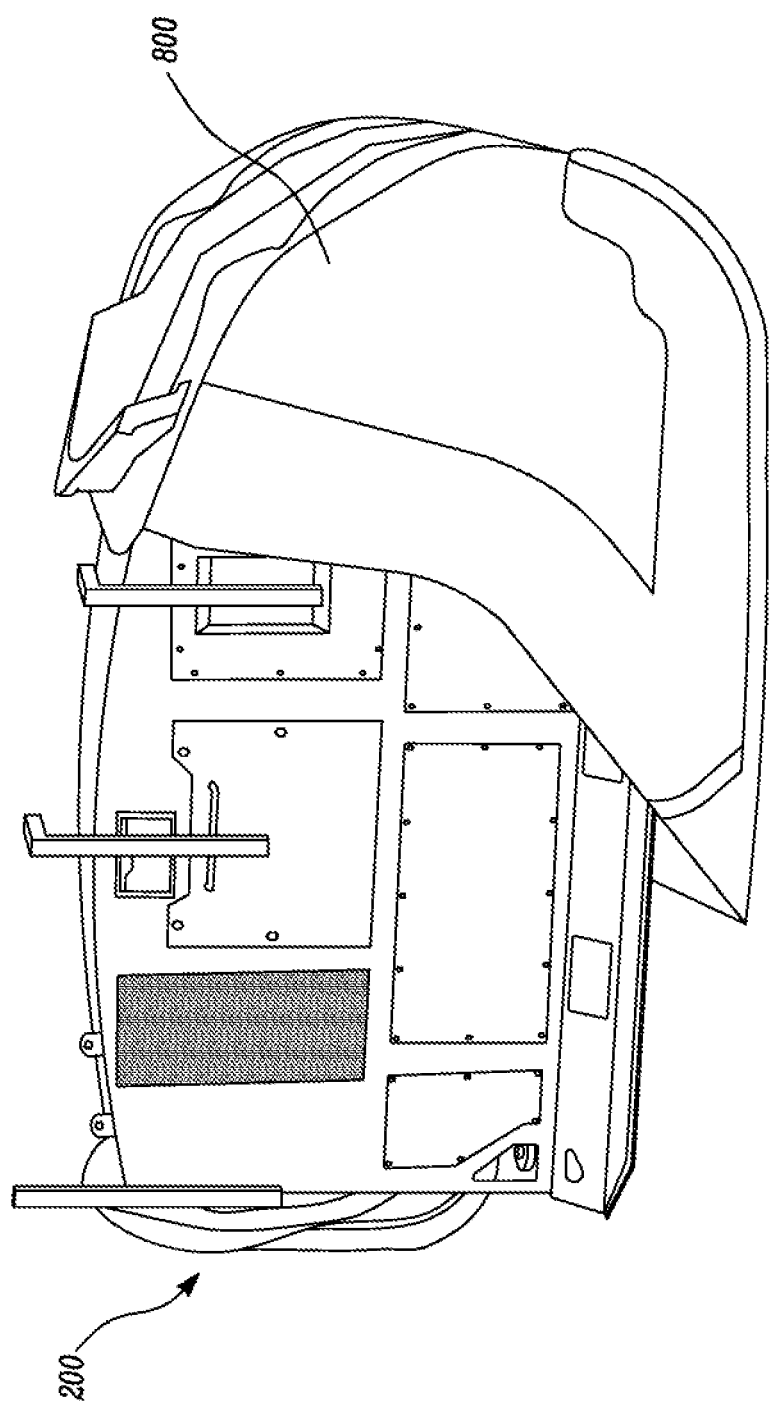
FIG. 8 illustrates the portable charger assembly being transported by a machine implement.

Referring now to FIG. 8, the portable charger assembly 200 may be transported by the machine implement 800. The machine implement 800 may be associated with a construction machine that may be similar to the vehicle 101 shown in FIG. 1. More particularly, the construction machine may embody a front loader or a load haul dump. The portable charger assembly 200 may be positioned within the machine implement 800 for transportation of the portable charger assembly 200. In the illustrated example, the machine implement 800 is embodied as a bucket. In alternative examples, the portable charger assembly 200 may be positioned in a payload carrier of a truck, such as a mining truck, or pushed by a blade of a construction machine, without any limitations.

Figure 9:
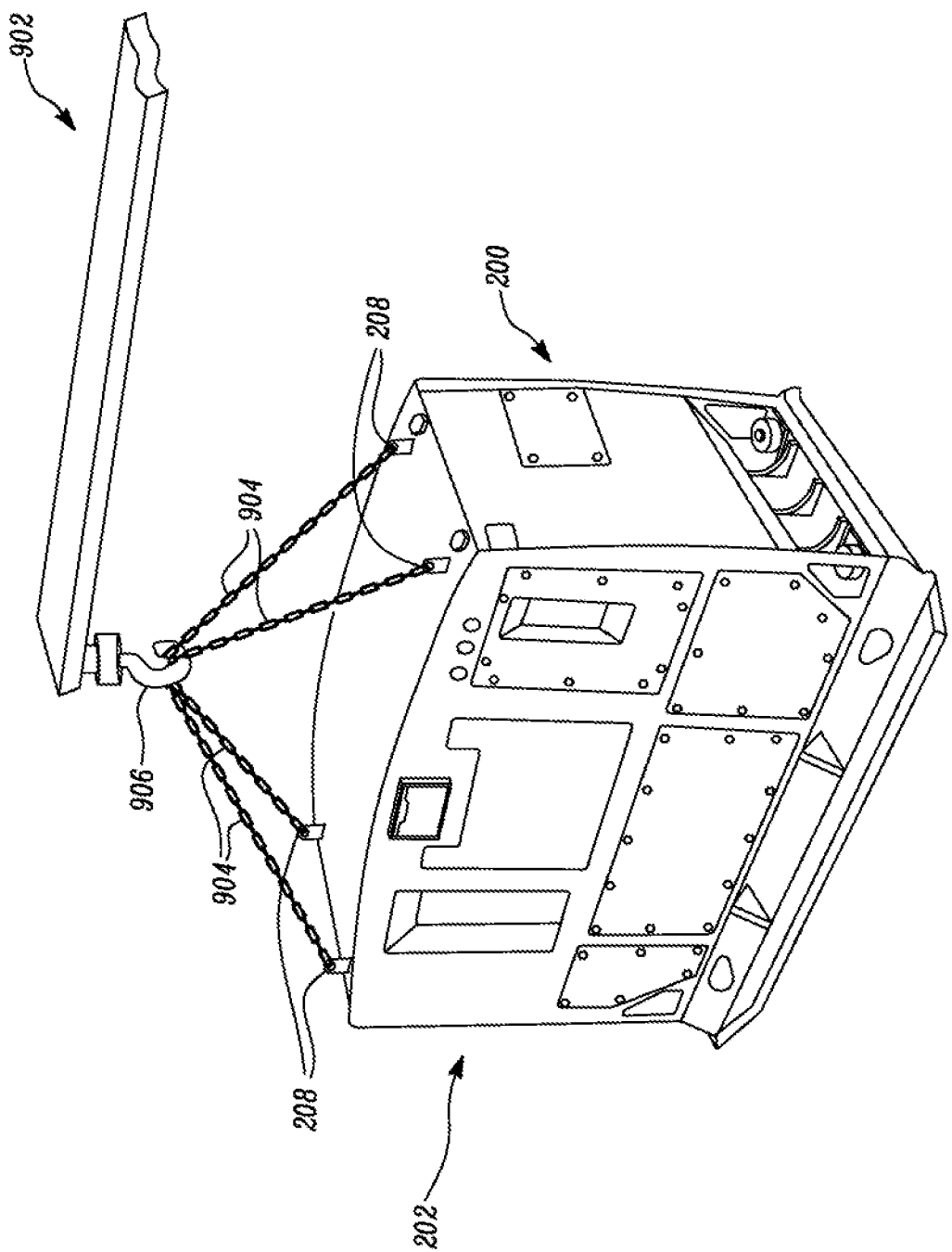
FIG. 9 illustrates portable charger assembly being transported by a lifting device.

Referring now to FIG. 9, the portable charger assembly 200 may be transported by the lifting device 902. The number of hooks 208 of the housing 202 are coupled with the lifting device 902 operable to lift the portable charger assembly 200. In the illustrated example, the lifting device 902 is embodied as a crane. The lifting device 902 includes a number of restraining elements 904. More particularly, the lifting device 902 includes four separate restraining elements 904. Each restraining element 904 is coupled with a corresponding hook 208. One end of each restraining element 904 is coupled with a hook 906 of the lifting device 902 and another end of each restraining element 904 is coupled with the hook 208 of the housing 202. In other examples, a single restraining element 904 may pass through each of the hooks 208 of the housing 202 and may be coupled with the hook 906. It should be noted that the restraining elements 904 may be embodied as chains, cables, or ropes, without any limitations.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The portable charger assembly 200 described herein provides a simple, effective, and cost-efficient solution for charging the battery system 100. Further, the portable charger assembly 200 may be used to charge a number of battery systems that may either be associated with vehicles or equipment. The portable charger assembly 200 is embodied as a high powered charger that provides fast charging. The portable charger assembly 200 includes a robust and sturdy design. Thus, the portable charger assembly 200 can be transported across rough terrains, such as at underground mining sites.

Further, the portable charger assembly 200 is durable and includes a compact design that can be easily transported to various remote worksites. Further, a structure of the base 228 is designed to reduce a probability of the portable charger assembly 200 to tip over during transportation. For example, the width "W1" of the base 228 is greater than the width "W2" of the housing 202 that provides improved stability and reduce the probability of tipping of the portable charger assembly 200.

The housing 202 of the portable charger assembly 200 is designed to isolate the components of the charging module 226 from outside environment. The housing 202 eliminates ingress of debris, water, or humidity into the hollow space 224 of the housing 202. The portable charger assembly 200 provides a dry environment within the housing 202, thereby ensuring longer operating life of electronics associated with the portable charger assembly 200. Further, the vibration mounts 238 are embodied as isolation mounts that isolate the housing 202 and the charging module 226 from vibrations and jerks.

The portable charger assembly 200 can be dragged or pushed around the worksite 102 or transported by machine implements, trailers, or forklifts that are readily available. Thus, the portable charger assembly 200 provides easy transportation of the portable charger assembly 200. The base 228 described herein is designed to provide improved structural stability. Moreover, the portable charger assembly 200 can be moved around the vehicle 101 and placed at a desired location around the vehicle 101 from where the battery system 100 can be easily charged. Thus, a need for orienting the vehicle 101 with respect to the portable charger assembly 200 is eliminated.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A portable charger assembly operable to charge a battery system, the portable charger assembly comprising:
   a housing defining a hollow space;
   a charging module disposed within the hollow space of the housing, wherein the charging module is adapted to provide power supply to the battery' system; and
   a base adapted to be coupled with the housing; and
   a plurality of vibration mounts adapted to removably and individually couple the housing to the base and separately to a transport trailer without the base,
   wherein the base includes:
      a base member including a first portion, a second portion, and a third portion, wherein each of the second and third, portions is inclined relative to the first portion;
      a first baseplate fixedly coupled to the second portion of the base member; and
      a second base plate fixedly coupled to the third portion of the base member.

2. The portable charger assembly of claim 1,
   wherein a first width of a bottom of the base is greater than a second width of a bottom of the housing, and
   wherein a third width of a top of the base is the same as the second width of the bottom of the housing.

3. The portable charger assembly of claim 1, wherein the first base plate defines a first contact surface and a pair of second contact surfaces inclined relative to the first contact surface.

4. The portable charger assembly of claim 1, wherein the second base plate defines a third contact surface and a pair of fourth contact surfaces inclined relative to the third contact surface.

5. The portable charger assembly of claim 1, wherein the second portion defines at least one first opening and the third portion defines at least one second opening, the at least one first opening and the at least one second opening being adapted to couple with a pulling device for transportation of the portable charger assembly.

6. The portable charger assembly of claim 1, wherein the base member defines a pair of first passages extending between the second portion and the third portion, the pair of first passages being adapted to couple with a transport vehicle for transportation of the portable charger assembly, the transport vehicle being different from the transport trailer.

7. The portable charger assembly of claim 6, wherein the base member defines a pair of second passages disposed perpendicular to the pair of first passages, the pair of second passages being adapted to couple with the transport vehicle.

8. The portable charger assembly of claim 1, wherein the portable charger assembly is transportable by at least one of the transport trailer and a machine implement.

9. The portable charger assembly of claim 1, wherein the housing includes a plurality of hooks disposed on an upper surface thereof.

10. The portable charger assembly of claim 9, wherein the plurality of hooks are adapted to couple with a lifting device operable to lift the portable charger assembly.

11. A skid associated with a portable charger assembly adapted to charge a battery system, the skid comprising:
- a base member including a first portion, a second portion, and a third portion, wherein each of the second and third portions is inclined relative to the first portion;
- a first base plate fixedly coupled to the second portion of the base member; and
- a second base plate fixedly coupled to the third portion of the base member,
- wherein the second portion defines at least one first opening and the third portion defines at least one second opening, the at least one first opening and the at least one second opening being adapted to couple with a pulling device for transportation of the portable charger assembly,
- wherein the base member defines a pair of first passages extending between the second portion and the third portion, the pair of first passages being adapted to couple with a transport vehicle for transportation of the portable charger assembly, and
- wherein the base member defines a pair of second passages disposed perpendicular to the pair of first passages, the pair of second passages being adapted to couple with the transport vehicle.

12. The skid of claim 11,
- wherein the skid is adapted to be coupled with a housing of the portable charger assembly, and
- wherein a first width of the skid is greater than a second width of the housing.

13. The skid of claim 11, wherein the first base plate defines a first contact surface and a pair of second contact surfaces inclined relative to the first contact surface.

14. The skid of claim 11, wherein the second base plate defines a third contact surface and a pair of fourth, contact surfaces inclined relative to the third contact surface.

15. The skid of claim 11, wherein the portable charger assembly is transportable by at least two of a machine implement, a trailer, and a lifting device, in addition to the transport vehicle.

16. The portable charger assembly of claim 1,
- wherein the second portion defines at least a pair of the first openings and the third portion defines at least a pair of the second openings, the pair of first openings and the pair of second openings being adapted to couple with a pulling device for transportation of the portable charger assembly,
- wherein the base member defines a pair of first passages extending between the second portion and the third portion, the pair of first passages being adapted to couple with a transport vehicle for transportation of the portable charger assembly,
- wherein the base member defines a pair of second passages disposed perpendicular to the pair of first passages, the pair of second passages being adapted to couple with the transport vehicle, and
- wherein the transport vehicle is different from the transport trailer.

17. The portable charger assembly of claim 16,
- wherein the housing includes a plurality of hooks disposed on an upper surface thereof, and
- wherein the plurality of hooks are adapted to couple with a lifting device operable to lift the portable charger assembly.

18. The portable charger assembly of claim 1, wherein an upper surface of the housing is curved from a front end of the housing to a rear end of the housing, and a lower surface of the base is flat, so as to be accommodatable in a machine implement of a front loader or a load haul dump for transportation of the portable charger assembly.

19. The skid of claim 11, wherein the second portion defines at least a pair of the first openings and the third portion defines at least a pair of the second openings, the pair of the first openings and the pair of the second openings being adapted to couple with the pulling device for transportation of the portable charger assembly.

* * * * *